Aug. 14, 1951  W. O. BENNETT, JR., ET AL  2,564,636
FREQUENCY STANDARD
Filed May 22, 1946
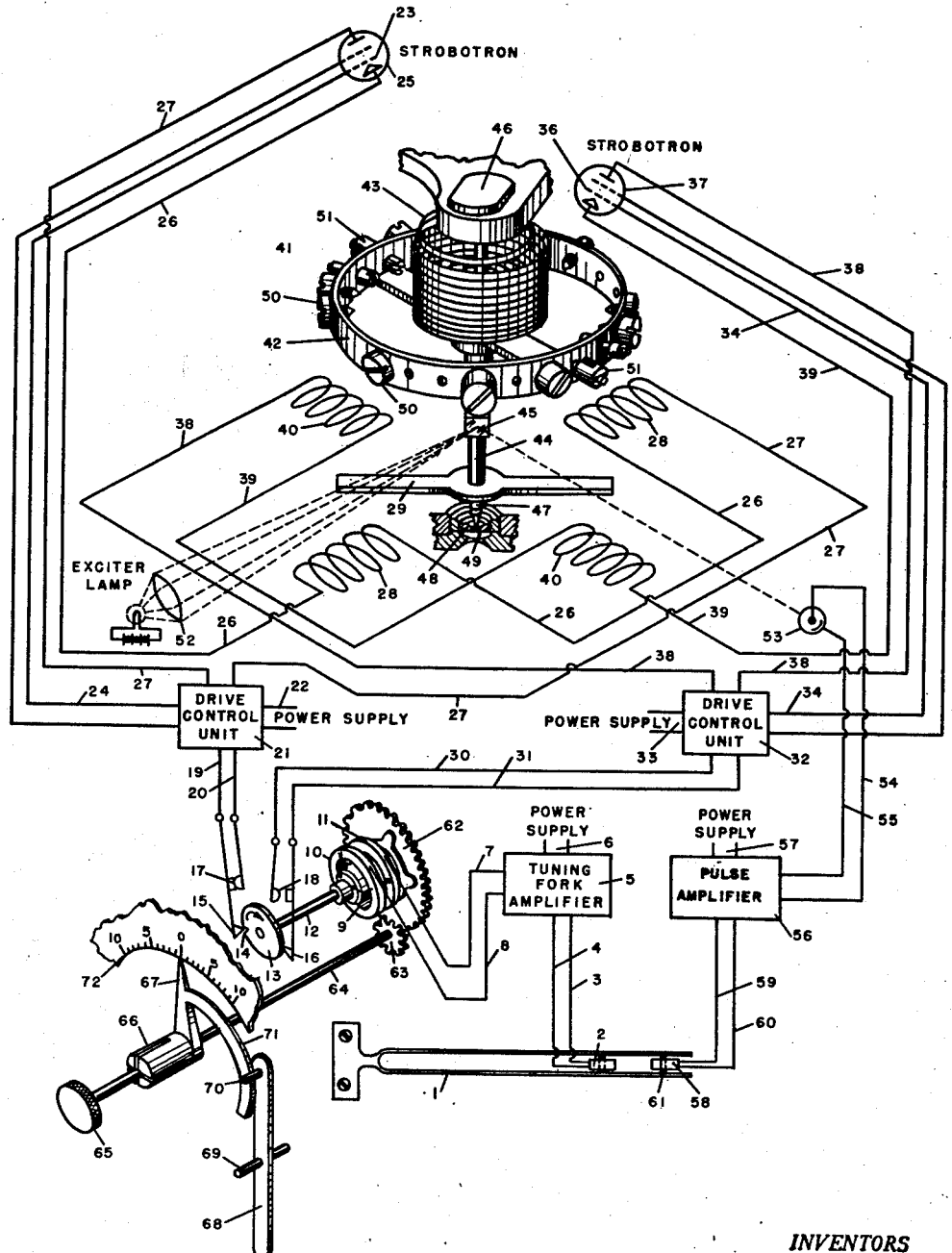
INVENTORS
WILLIAM O. BENNETT JR.
FRED KOEHLER
BY
Murray W. Gouly
ATTY.

Patented Aug. 14, 1951

2,564,636

UNITED STATES PATENT OFFICE 2,564,636

FREQUENCY STANDARD

William Ogle Bennett, Jr., Bayside, N. Y., and Fred Koehler, Lancaster, Pa., assignors to Hamilton Watch Company, Lancaster, Pa.

Application May 22, 1946, Serial No. 671,553

4 Claims. (Cl. 58—28)

This invention relates to a method and means of impulsing a timepiece balance wheel and hairspring assembly at the position at which the hairspring is unstressed, and so obtaining from the oscillations of the balance wheel a perfectly accurate source of timekeeping, or for creating an exact predetermined frequency.

The object of the invention is to provide an apparatus and method of impulsing a timepiece balance and hairspring assembly so that the period is completely unaffected by said impulses.

A further object of the present invention is to provide an apparatus for impulsing a balance wheel at the exact position at which the hairspring is unstressed.

A further object of the present invention is to provide an electro-magnetic means for impulsing a balance wheel, and from the motion of said balance wheel to produce a source of accurate time.

A further object of the present invention is to provide an apparatus and means for impulsing a balance wheel at the exact position at which the hairspring is unstressed, and from the motion thus created drive a frequency producing means which in turn operates a synchronous motor, which controls the power for impulsing the balance wheel.

A still further object of the present invention is to provide an apparatus and means for electro-magnetically impulsing a balance wheel at the exact position at which the hairspring is unstressed, with means for controlling the strength of said impulses and deriving from the oscillations thus produced an electric current used to actuate and control a frequency producing means, which in turn drives a synchronous motor to control the application of the driving force to the balance wheel.

A still further object of the present invention is to provide a pivoted balance wheel having light reflecting means thereon, with means for impulsing said balance wheel at the exact position at which the hairspring is unstressed in two directions alternately, shining the light onto the reflecting means carried by the balance wheel and receiving said beam of light on a selenium cell for producing electric current pulses of a frequency in accord with the period of the balance wheel, and using said pulses thus produced to operate a tuning-fork which produces an accurate desired frequency, and in addition operates a synchronous motor which controls the application of power to provide the impulses for the balance wheel.

A still further object of the present invention is to provide electro-magnetic means for impulsing a balance wheel and hairspring assembly without affecting its fundamental period, and creating from the oscillation of the balance wheel electric current pulses through light transmission, using this electric current to operate a tuning-fork and taking from the vibration of the tuning-fork onto pick-up coils an electric current having the frequency of the tuning-fork, and driving a synchronous motor with the current thus produced to control the electro-magnetic impulses given to the balance wheel.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is shown diagrammatically in the accompanying drawing in which the balance wheel is drawn in perspective to produce a more understandable drawing.

Assuming that the apparatus is at rest, the tuning-fork 1 is snapped with a pencil or finger to produce vibrations. These vibrations are picked up by pick-up coil 2 and transmitted along wires 3 and 4 to the tuning-fork amplifier 5, which receives its power supply from an outside line 6. From the tuning-fork amplifier wires 7 and 8 convey the exact sixty cycle current to a synchronous motor 9 having collector rings 10 and 11. The motor 9 drives shaft 12, which carries thereon a cam 13 having a notch 14 in its periphery. Cam followers 15 and 16, ordinarily riding on the edge of cam 13, control respectively the making and breaking of contacts 17 and 18, these contacts being closed momentarily and 180 degrees apart, in the motion of the cam when the cam followers 15 or 16 drop into the notch 14.

The contact 18, while it is shown here in diagrammatic form, is in the actual instrument made adjustable so that it can be set exactly 180 degrees from the contact 17. While this does not form a vital part of the invention and is not shown on the diagrammatic drawing, it does provide means for accurately adjusting the contacts with regard to each other.

Closing of the circuit by means of the contact 17 allows current to flow in the wires 19 and 20 to the drive control unit 21, which has its source of power 22. Actuated by the energized drive control unit, an inner grid 23 receiving current through wire 24 controls the strobotron tube 25, while supplies current through wires 26 and 27 to the paired coils 28 which serve to impulse the ferro-magnetic arm 29 in a counterclockwise direction. Likewise, closing of the contact 18 supplies current through wires 30 and 31 to the drive control unit 32 having a source of power supply 33. Wire 34 energizes the inner grid 36 of the strobotron tube 37 causing a flow of current through wires 38 and 39 to energize the paired coils 40, which impulse the balance wheel through its ferro-magnetic arm 29 in a clockwise direction.

A balance wheel unit 41 of a marine chronometer type having the balance wheel 42 and its companion hairspring 43 of the temperature compensating type, as described in Patent #2,356,911, is supported on a staff 44. The staff 44 differs from the usual marine chronometer balance staff by being elongated to accommodate the ferromagnetic arm 29 and a mirror 45. The staff is mounted in upper jeweled bearing 46 and lower jeweled bearing 47 which are of the usual chronometer balance staff bearing construction having an olived hole jewel 48 and an endstone 49, the upper bearing being similar to the lower one which is here shown in cross-section. The balance wheel is provided with the usual weight screws 50 and adjustable timing weights 51 so that a perfectly poised balance wheel with practical elimination of friction is utilized.

The mirror 45, supported on the lower section of the staff 44, receives light from a source 52 and at the exact center of swing (assuming the balance wheel assembly is oscillating) flashes a narrow beam of this light to the photo-electric cell 53, which beam sets up an electric current in the wires 54 and 55, which is transmitted to the pulse amplifier 56 having its source of power supply 57. The amplifier and pulse producer operates an electro-magnet 58 through wires 59 and 60, said electro-magnet having a ferromagnetic core 61 adapted to vibrate the tuning-fork 1, which completes the cycle of operation.

The motor 9 has attached thereto a large gear 62 in mesh with a smaller gear 63 carried on a shaft 64, which is turned through the medium of a thumb screw 65. Operation of the thumb screw 65 serves to adjust the phase of the motor which, of course, controls the making of contacts 17 and 18, in turn controlling the time at which the impulses are delivered to the arm 29. Frictionally mounted on the shaft 64 is a sleeve 66 carrying a pointer 67 which normally rotates with the shaft 64. Locking means are provided in the form of a lever 68 pivoted at 69 and carrying a pin 70, which engages in a notch in the arcuate shaped bar 71 attached to the pointer 67. This provides means for obtaining a zero setting of the motor and then afterwards permitting adjustment as to the phase of the motor and against the scale 72, which underlies the pointer 67 and which is calibrated in thousandths of seconds. At the same time this provides a very fine and accurate adjustment should it be desired to slightly decrease or increase the period of the balance.

The invention made up of the parts above described can be utilized to produce any desired frequency exactly. It also can be used in the testing of oils at the pivots of the balance staff as the other factors affecting the rate can be eliminated, any deviation in rate can be held against the oil used.

In operation and assuming that the device is started by mechanically vibrating the tuning-fork 1, although a slight rotation of the balance wheel 42 would accomplish the same purpose, a pick-up coil 2 receives the vibrations of the tuning-fork 1 and transmits said frequency thus set up to an amplifier. The current is then delivered to the synchronous motor 9 through the collector rings 10 and 11, which motor operates the cam 13 through the shaft 12. Rotation of the shaft 12 causes the contact 17 and 18 to be made once every revolution and 180 degrees apart.

Following the making of contact 17, current is supplied to the inner grid 23 of the strobotron tube 25 by the drive control unit 21. Energization of the grid 23 fires the strobotron tube 25 causing a flow of current in the paired coils 28, which attracts the arm 29 toward the coils. This, of course, oscillates the balance wheel as the arm 29 is attached to the shaft 44 which supports the balance wheel and hairspring assembly 42 and 43. A like operation occurs when contact 18 is closed through the strobotron tube 36 and the paired coils 40 causing the attraction imparted to the arm to be opposite to that caused by the paired coils 28. This impulses the balance wheel twice for each revolution of the cam 13 and alternately and in opposite directions.

The mirror 45 carried on the staff 44 receives light from the lamp 52 and at the exact point at which the hairspring is unstressed or at the mid-point of travel in the oscillations of the balance wheel, which is the only point at which the balance wheel can be impulsed without disturbing the rate. The mirror 45 flashes the light to a photo-electric cell 53 and the electric pulses thus produced are amplified and supplied to the magnet 58, which in turn vibrates the tuning-fork thus completing the cycle of operation.

What is claimed is:

1. An apparatus for producing a source of exact repeated cycles of recurrent phenomena comprising a timepiece balance and hairspring assembly, means for impulsing said balance wheel at a point in the period of the balance wheel at which the hairspring is unstressed so as not to affect the rate of said balance wheel, means associated with said balance wheel for controlling a source of electrical pulses, means for utilizing said pulses to energize a vibrating source and means for converting said vibrations emanating from said vibrating source into electrical frequency to impulse said balance wheel.

2. In an apparatus for producing exact repeated cycles of recurrent phenomena, a tuning-fork serving as a vibrating slave, a pick-up coil transcribing said vibrations into electrical frequency, means for amplifying said frequency, a synchronous motor operated by said frequency, a cam driven by said motor and formed with a notch in its periphery, a pair of cam followers riding on the periphery of said cam and 180 degrees apart, electrical contacts adapted to be closed by the action of said cam followers when in contact with said notch, a balance wheel and hairspring assembly carried on a pivoted staff, pairs of paired coils spaced from said staff and around the same, a ferro-magnetic bar attached to said staff and movable in the path of said coil influence, strobotron tubes controlled by said cam controlled contacts and furnishing power alternately to said paired coils, whereby said coils exert an attractive magnetic influence on said ferro-magnetic bar at the instant the balance wheel is in the position at which the hairspring is unstressed, alternately and in opposite directions, means carried by said staff controlling electrical pulses adapted to operate a magnetic core which continually vibrates and synchronizes said tuning-fork at predetermined intervals.

3. An apparatus according to claim 2, and means for controlling the phase of the synchronous motor.

4. An apparatus for producing a source of exact repeated cycles of recurrent phenomena comprising a vibrating fork, means converting said vibrations into alternating current frequency, means for amplifying said alternating current, a synchronous motor driven by said current, a cam driven by said motor, a pair of cam followers operated alternately by said cam, a pair of contacts actuated by said cam followers, a pair of drive control units energized respectively by said electrical contacts, a pair of strobotron tubes fired respectively by each of said drive control units, paired impulse coils energized by the firing of said strobotron tubes, a balance wheel having a balance staff pivotally mounted in bearings, a magnetically attracted arm carried by said staff and adapted to be attracted in opposite directions by said paired impulse coils, a mirror carried by said balance wheel staff, a source of light, a photo-electric cell receiving said source of light through the medium of the mirror and in the form of flashes, an amplifier and pulse producer energized by said photo-cell and a coil operated from said amplifier and pulse producer and serving to vibrate said tuning-fork at periodic intervals.

WILLIAM OGLE BENNETT, JR.
FRED KOEHLER.

REFERENCES CITED

The following references are of record in the file of this patent:

UNITED STATES PATENTS

| Number | Name | Date |
| --- | --- | --- |
| 2,033,899 | Poole | Mar. 10, 1936 |
| 2,066,349 | Hellweg et al. | Jan. 5, 1937 |
| 2,143,074 | Killman et al. | Jan. 10, 1939 |
| 2,482,061 | Hamlin | Sept. 13, 1949 |